(12) United States Patent
Gauthier et al.

(10) Patent No.: US 9,027,219 B2
(45) Date of Patent: May 12, 2015

(54) SHAFT SECURING MECHANISM FOR A TOOL

(75) Inventors: Michael T. Gauthier, Grafton, WI (US); Robert F. Miller, Grafton, WI (US)

(73) Assignee: Gauthier Biomedical, Inc., Grafton, WI (US)

( * ) Notice: Subject to any disclaimer, the term of this patent is extended or adjusted under 35 U.S.C. 154(b) by 823 days.

(21) Appl. No.: 13/284,072

(22) Filed: Oct. 28, 2011

(65) Prior Publication Data

US 2012/0103144 A1    May 3, 2012

Related U.S. Application Data

(60) Provisional application No. 61/408,284, filed on Oct. 29, 2010.

(51) Int. Cl.
| | | |
|---|---|---|
| *B23B 31/22* | (2006.01) | |
| *B25G 3/22* | (2006.01) | |
| *B25B 23/00* | (2006.01) | |
| *B25B 15/02* | (2006.01) | |

(52) U.S. Cl.
CPC ..... *B25B 23/0042* (2013.01); *B23B 2231/0228* (2013.01); *B23B 31/22* (2013.01); *B23B 2231/024* (2013.01); *B25B 15/02* (2013.01); *B25G 3/22* (2013.01); *Y10S 279/905* (2013.01)

(58) Field of Classification Search
CPC ........... B23G 31/22; B23G 2231/0228; B23G 2231/024; B25B 23/0042; B25G 3/22
USPC ................... 29/428; 279/22, 30, 75, 82, 905; 81/177.85
See application file for complete search history.

(56) References Cited

U.S. PATENT DOCUMENTS

| | | | | |
|---|---|---|---|---|
| 1,168,540 | A * | 1/1916 | Musselman | 279/75 |
| 3,039,781 | A * | 6/1962 | Bilz | 279/75 |
| 3,398,965 | A * | 8/1968 | Cox | 279/30 |
| 3,521,895 | A * | 7/1970 | Smith | 279/22 |
| 3,674,281 | A * | 7/1972 | Hedrick | 279/30 |
| 4,309,042 | A * | 1/1982 | Fauth et al. | 279/75 |
| 5,222,956 | A * | 6/1993 | Waldron | 606/80 |
| 5,464,229 | A * | 11/1995 | Salpaka | 279/30 |
| 6,179,302 | B1 * | 1/2001 | Gauthier et al. | 279/75 |
| 6,561,523 | B1 * | 5/2003 | Wienhold | 279/30 |
| 6,901,826 | B2 * | 6/2005 | Huang | 81/177.2 |
| 7,287,449 | B2 * | 10/2007 | Abel et al. | 81/177.2 |
| 7,448,302 | B2 * | 11/2008 | Huang | 81/438 |

(Continued)

FOREIGN PATENT DOCUMENTS

DE          29921004 U1 *   1/2000   .............. B23B 31/22

OTHER PUBLICATIONS

Gauthier Biomedical, Inc., Illulstration Drawing Reference Only, Nov. 1, 1999, 5: Ratcheting Screwdriver with Secure Shaft Connector.

*Primary Examiner* — Eric A Gates
(74) *Attorney, Agent, or Firm* — Boyle Fredrickson, S.C.

(57) ABSTRACT

A securing mechanism is provided for a tool that allows for the attachment and release of the shafts of a variety of implements from the tool. The mechanism has a construction that provides an easily releasable, but secure engagement of the implement shaft within the mechanism while also having an alignment feature which engages the implement at multiple locations when engaged with the mechanism to maintain the alignment and concentricity of the implement shaft with regard to the mechanism and the tool when in use.

6 Claims, 8 Drawing Sheets

(56) References Cited

U.S. PATENT DOCUMENTS

| | | | |
|---|---|---|---|
| 7,500,811 B2* | 3/2009 | Pfob | 408/56 |
| 7,810,817 B1 | 10/2010 | Gao | |
| 7,896,355 B2* | 3/2011 | Wienhold | 279/22 |
| 8,210,545 B2* | 7/2012 | Hild et al. | 279/19.6 |
| 8,764,025 B1* | 7/2014 | Gao | 279/30 |
| 2008/0246233 A1* | 10/2008 | Wienhold | 279/82 |
| 2009/0261536 A1 | 10/2009 | Beale et al. | |

* cited by examiner

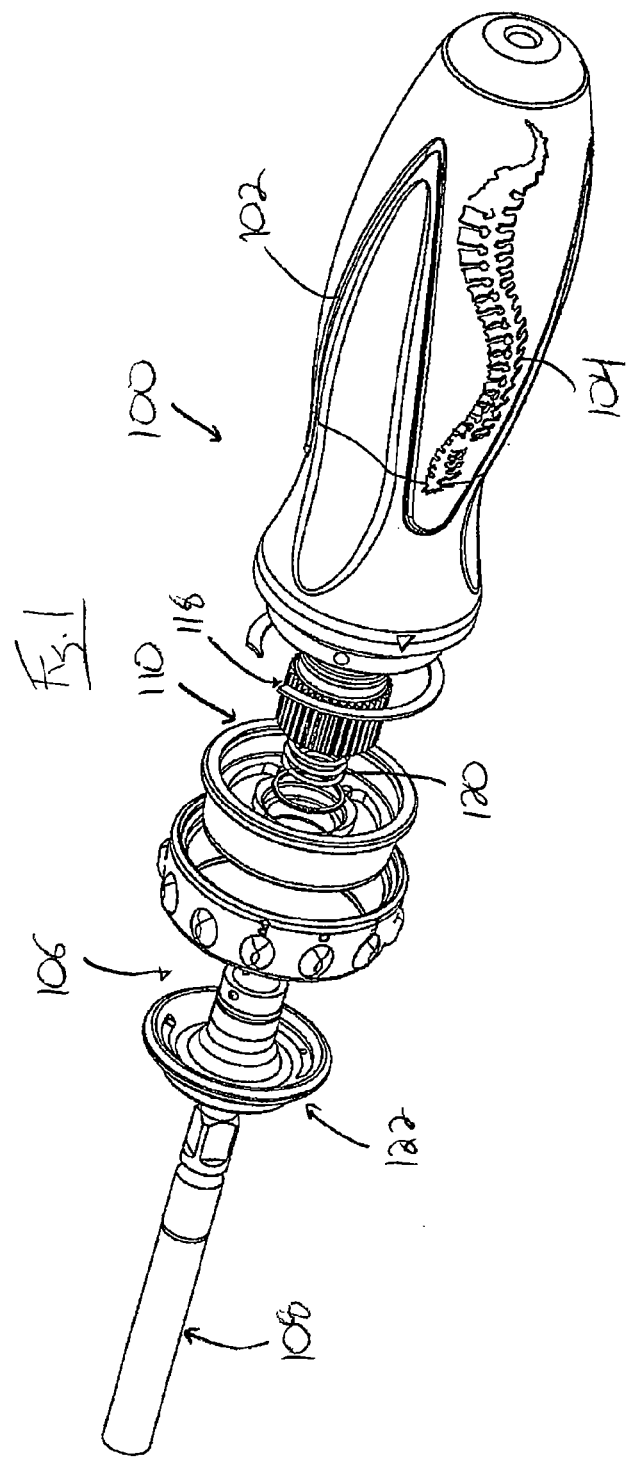

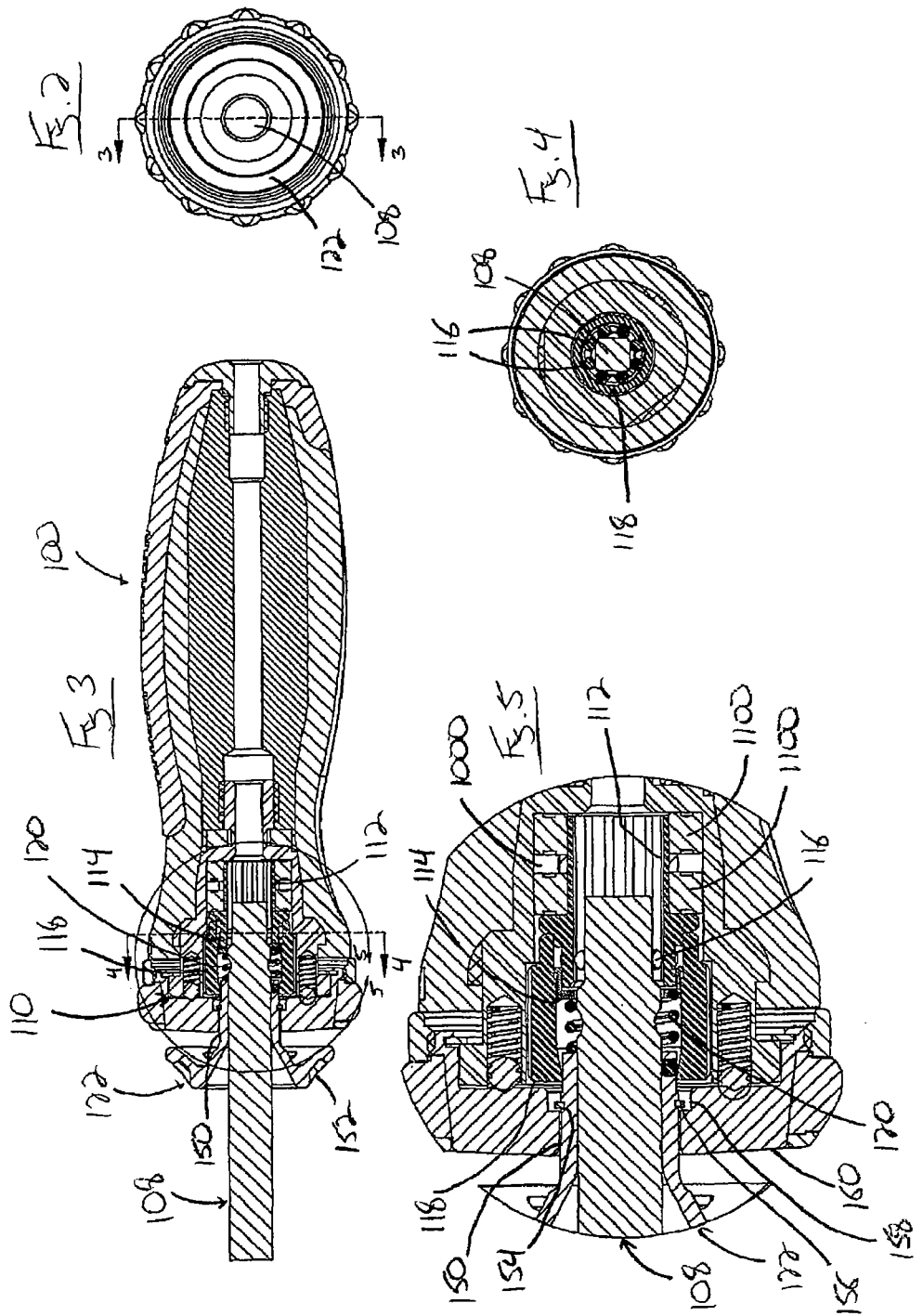

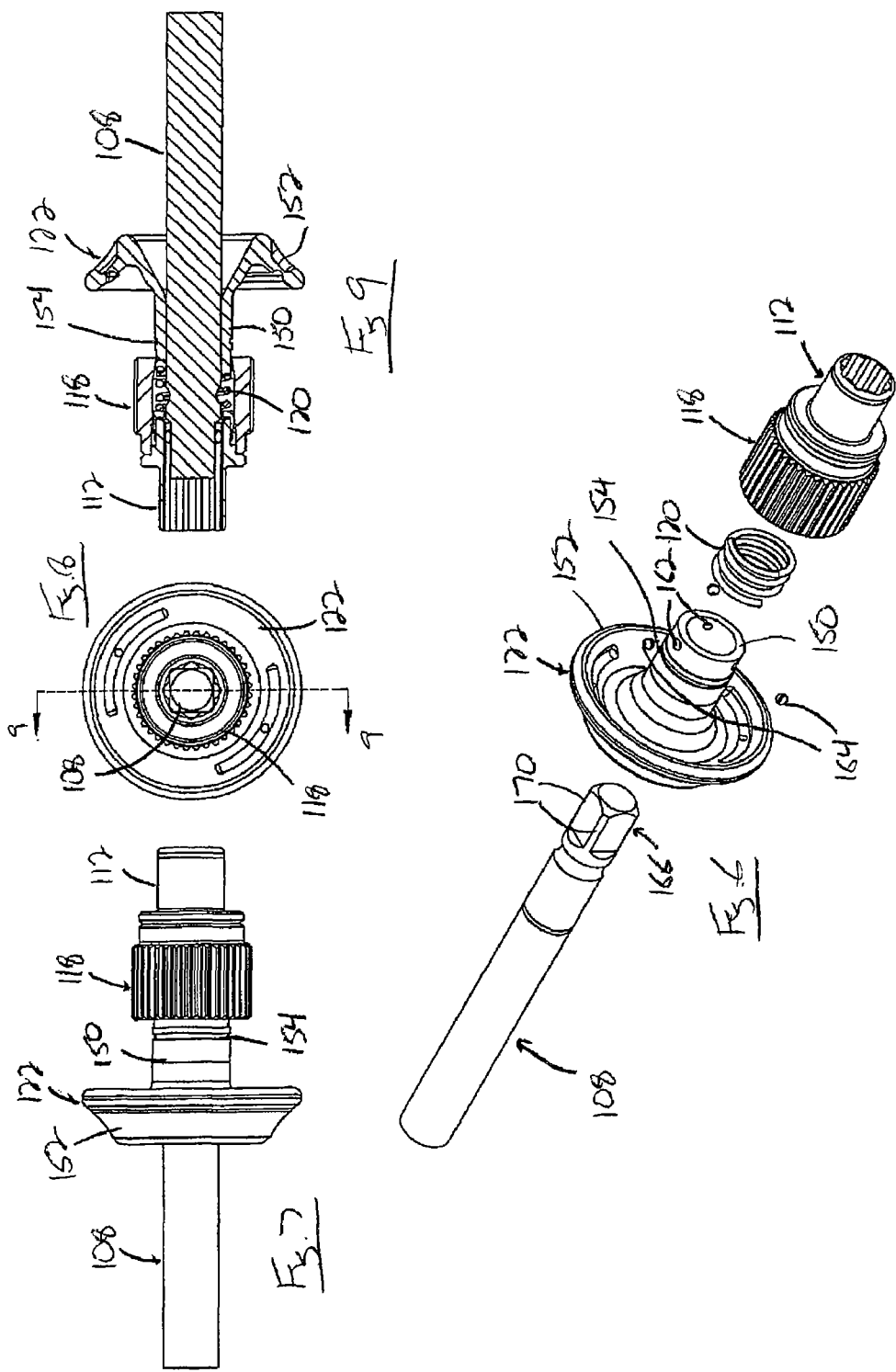

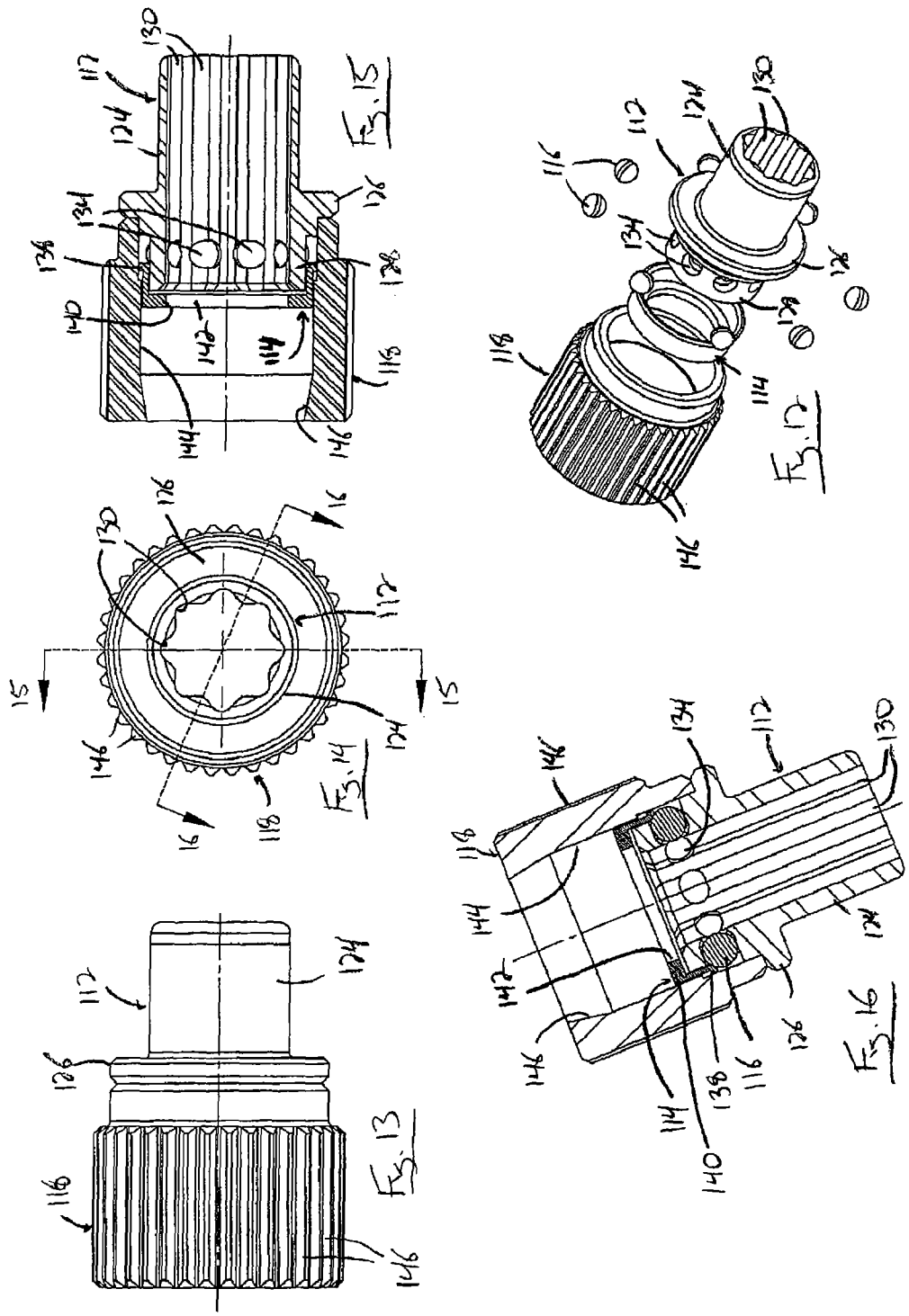

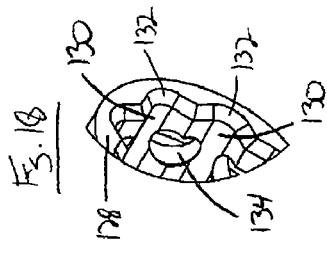
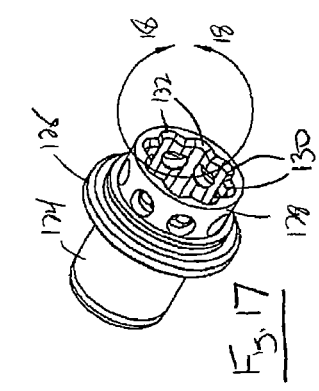
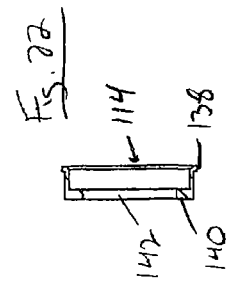
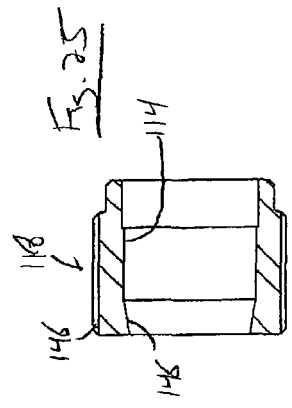
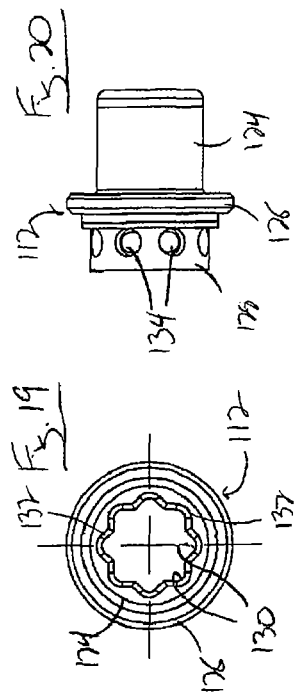
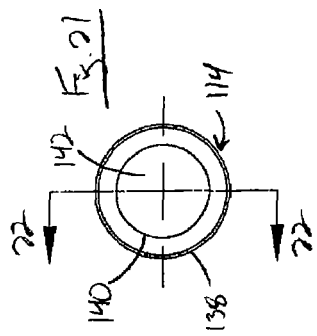
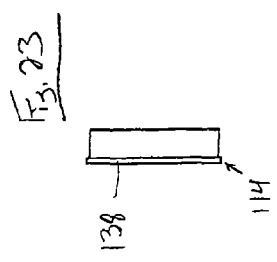
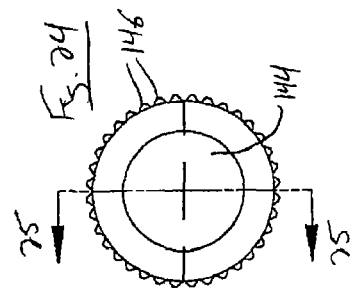

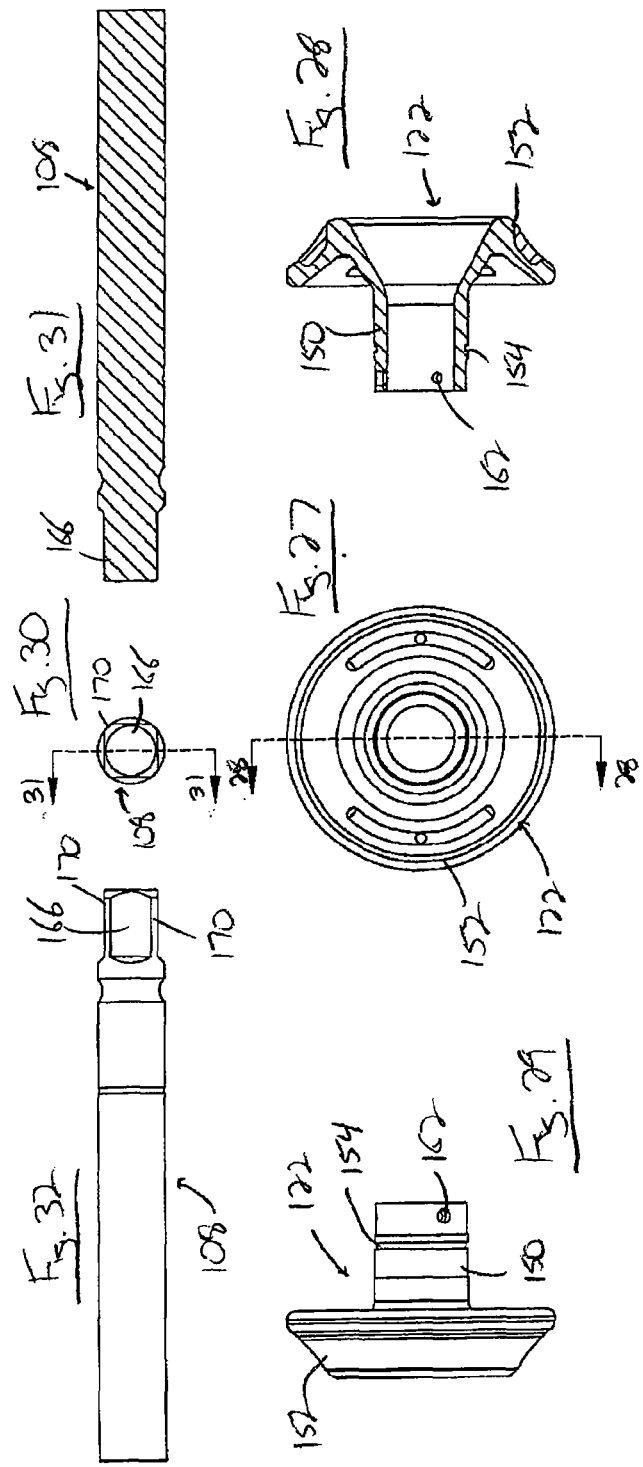

SHAFT SECURING MECHANISM FOR A TOOL

CROSS-REFERENCE TO RELATED APPLICATIONS

This application claims priority from U.S. Provisional Patent Application Ser. No. 61/408,284, filed on Oct. 29, 2010, the entirety of which is expressly incorporated by reference herein.

FIELD OF THE INVENTION

The present invention relates to hand tools, and more specifically to a mechanism for releasably securing various implements and shafts to a hand tool.

BACKGROUND OF THE INVENTION

Hand tools are designed for a variety of uses to enable individuals to perform various tasks. These tools include handles that can be grasped by the individual in order to more securely operate the tool.

A number of tools of this type include various mechanisms that enable the tool to have a number of different implements having an attachment shaft attached to the tool. These mechanisms enable the shaft of the implement to be attached to the tool and utilized therewith in an interchangeable manner, allowing a single tool with multiple removable attachments to provide various functions.

However, one of the prevalent drawbacks with mechanisms of this type is that the mechanism is unable to attach the implement shaft to the tool in a manner that prevents the implement from being misaligned with regard to the tool during use of the tool and implement, such that it is often necessary to remove and re-attach the implement to the tool in order to reposition the implement in proper alignment with the tool.

Therefore, it is desirable to develop a securing mechanism for a tool that can be easily operated to secure and release various implements from the tool while maintaining the alignment of the shaft of the implement with regard to the tool when the implement is secured to the tool utilizing the mechanism and in use.

SUMMARY OF THE INVENTION

According to a one aspect of the present invention, a securing mechanism is provided for a tool that allows for the attachment and release of the shafts of a variety of implements from the tool. The mechanism has a construction that provides a secure engagement of the implement shaft within the mechanism to substantially reduce any slop or play in the engagement of the implement and tool. Additionally, the mechanism has an alignment feature which maintains the alignment of the implement shaft with regard to the mechanism and the tool, and results in increased concentricity of the implement with the tool.

According to another aspect of the present invention, the mechanism has a relatively simple construction that enables the mechanism to be utilized with tools having various other mechanisms disposed therein without significantly affecting the operation or overall size of the tools.

Numerous other aspects, features, and advantages of the present invention will be made apparent from the following detailed description together with the drawings figures.

BRIEF DESCRIPTION OF THE DRAWINGS

The drawings illustrate the best mode currently contemplated of practicing the present invention.

In the drawings:

FIG. 1 is an exploded, isometric view of a tool including an implement securing mechanism constructed according to the present invention;

FIG. 2 is a front plan view of the tool of FIG. 1;

FIG. 3 is a cross-sectional view along line 3-3 of FIG. 2;

FIG. 4 is a cross-sectional view along line 4-4 of FIG. 3;

FIG. 5 is a sectional view along line 5-5 of FIG. 3;

FIG. 6 is an exploded, isometric view of the securing mechanism of FIG. 1;

FIG. 7 is a side plan view of the mechanism of FIG. 6;

FIG. 8 is a front plan view of the mechanism of FIG. 6;

FIG. 9 is a cross-sectional view along line 9-9 of FIG. 8;

FIG. 12 is an exploded, isometric view of a body for the mechanism of FIG. 6;

FIG. 13 is a side plan view of the body of FIG. 12;

FIG. 14 is a front plan view of the body of FIG. 12;

FIG. 15 is a cross-sectional view along line 15-15 of FIG. 14;

FIG. 16 is a cross-sectional view along line 16-16 of FIG. 14;

FIG. 17 is an isometric view of a socket of the mechanism of FIG. 6;

FIG. 18 is a sectional view along line 18-18 of FIG. 17;

FIG. 19 is a front plan view of the socket of FIG. 17;

FIG. 20 is a side plan view of the socket of FIG. 17;

FIG. 21 is a front plan view of a bushing of the mechanism of FIG. 6;

FIG. 22 is a cross-sectional view along line 22-22 of FIG. 21;

FIG. 23 is a side plan view of the bushing of FIG. 21;

FIG. 24 is a front plan view of a locking sleeve of the mechanism of FIG. 6;

FIG. 25 is a cross-sectional view along line 25-25 of FIG. 24;

FIG. 26 is a side plan view of the locking sleeve of FIG. 24;

FIG. 27 is a front plan view of a release collar of the mechanism of FIG. 6;

FIG. 28 is a cross-sectional view along line 28-28 of FIG. 27;

FIG. 29 is a side plan view of the collar of FIG. 27;

FIG. 30 is a front plan view of a shaft engageable with the mechanism of FIG. 6;

FIG. 31 is a cross-sectional view along line 31-31 of FIG. 30; and

FIG. 32 is a side plan view of the shaft of FIG. 30.

DETAILED DESCRIPTION OF THE INVENTION

Figure 10:
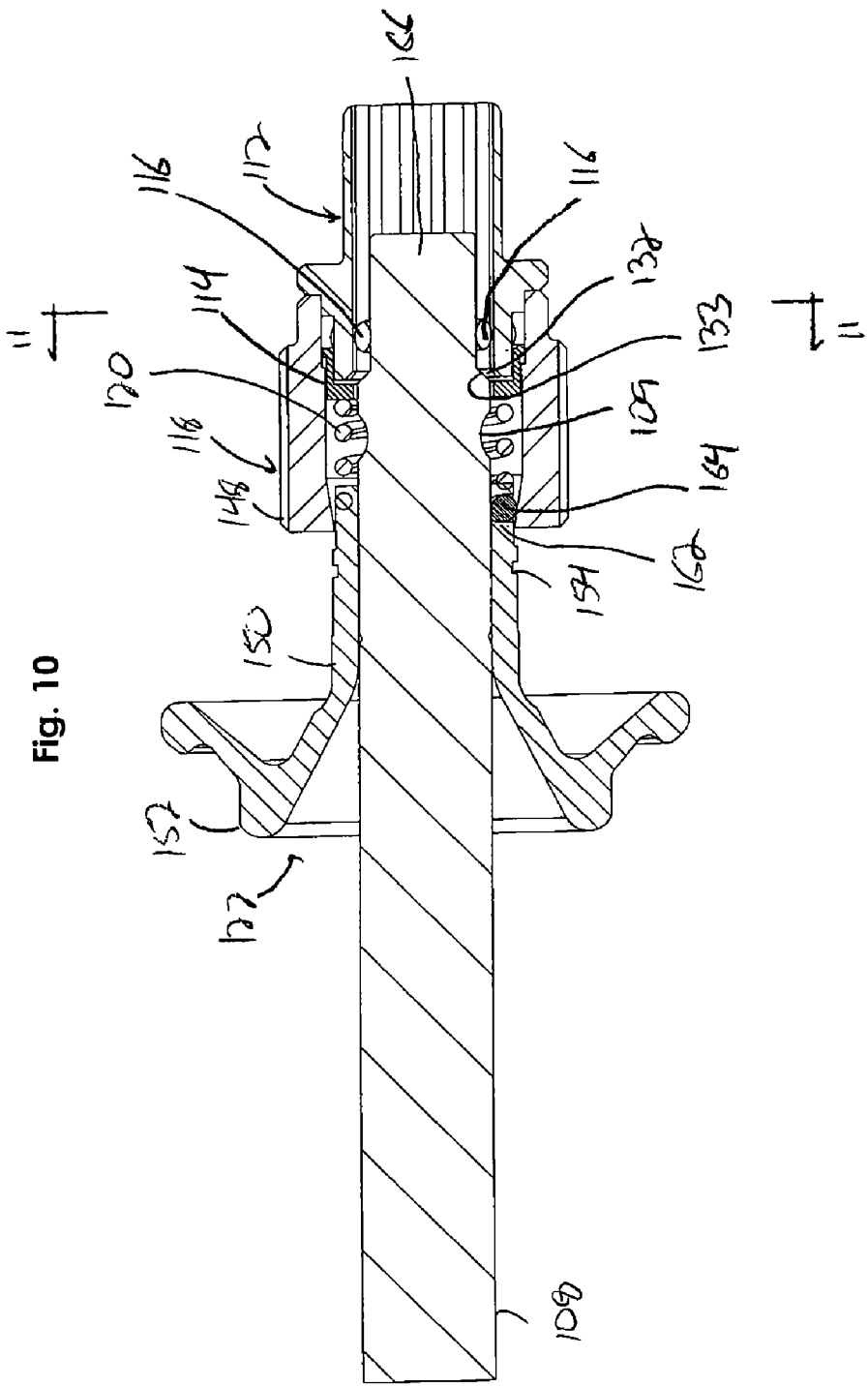
FIG. 10 is a cross-sectional view of the mechanism of FIG. 6.
Figure 11:
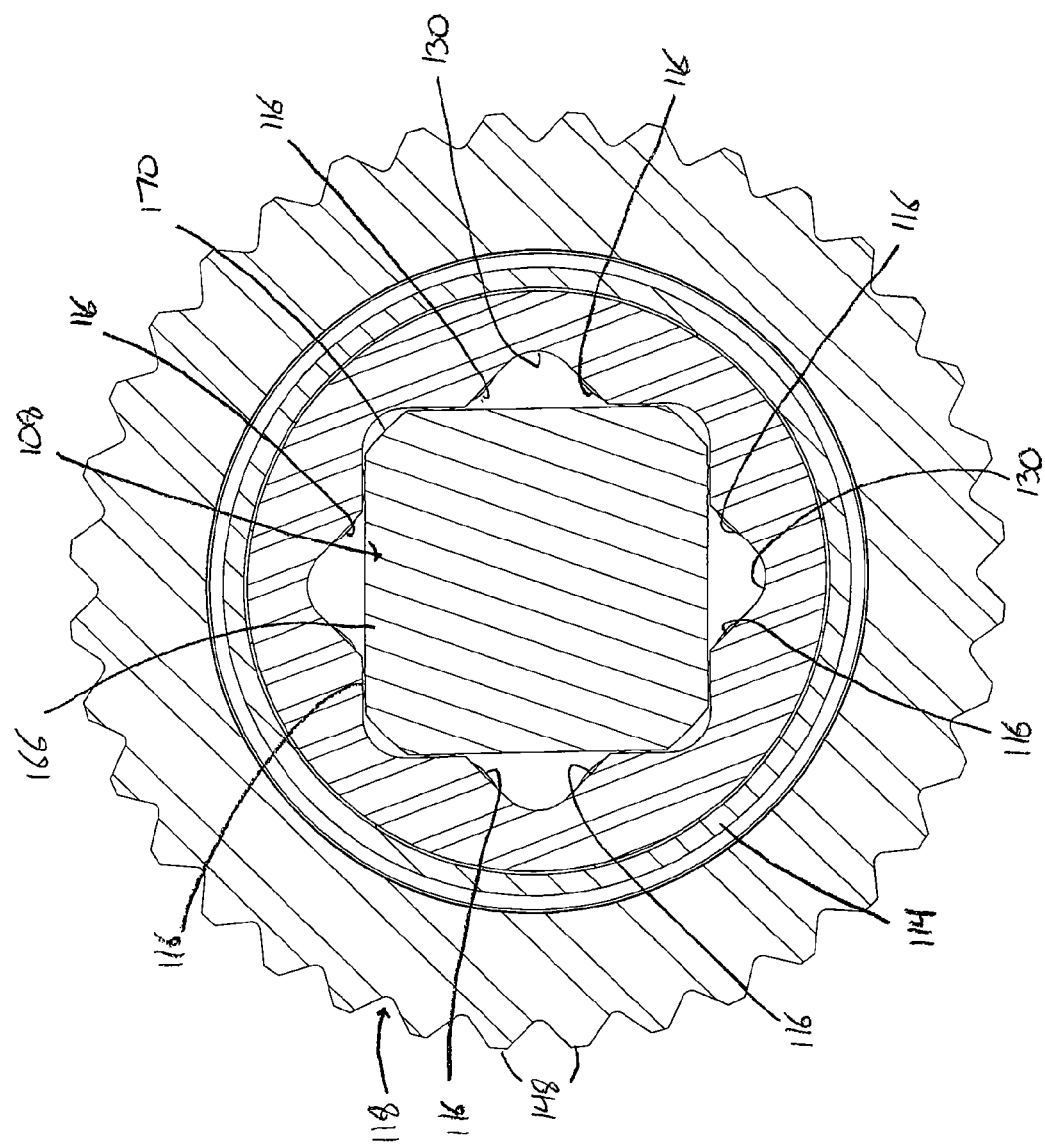
FIG. 11 is a cross-sectional view along line 11-11 of FIG. 10.

With reference now to the drawing figures in which like reference numerals designate like parts throughout the disclosure, an item, such as a tool handle, constructed according to the present invention is indicated generally at 100 in FIG. 1. The handle 100 can be formed in any shape to be utilized with a hand tool, and is preferably ergonomically shaped with tactile features 102 to assist an individual in maintaining a secure grip on the handle 100. In addition to the features 102, the handle 100 can have other design elements 104 positioned thereon as desired.

Looking now at FIGS. 1-11, the handle 100 is formed with a securing mechanism 106 that is capable of releasably securing a shaft 108 to the handle 100. The shaft 108 can include any implement or feature (not shown) at the end of the shaft 108 not secured to the mechanism 106 in order to provide various functionalities to the handle 100.

In addition to the securing mechanism 106, the handle 100 can also include other mechanisms therein alone or in combination with one another, such as, for example, a torque limiting mechanism or a ratcheting mechanism, such as those shown and described in co-pending and co-owned U.S. Non-Provisional patent application Ser. No. 12/241,696, which is expressly incorporated herein by reference in its entirety. Additionally, the handle 100 can incorporate a variable gear ratio mechanism, such as that shown and described in co-pending and co-owned U.S. Non-Provisional patent application Ser. No. 12/849,867, which is expressly incorporated herein by reference in its entirety.

In the one embodiment illustrated in the drawing figures, the securing mechanism 106 is incorporated within a handle 100 also including a ratcheting mechanism 110. The details of the mechanism 110 are not discussed in detail, as they are disclosed in the '696 application, mentioned previously and incorporated herein.

The securing mechanism 106 includes as component parts an engagement socket 112, a bushing 114, a number of ball bearings 116, a locking sleeve 118, a biasing spring 120 and a release collar 122. The engagement socket 112, as best shown in FIGS. 3, 5-11 and 17-20, is disposed within a cavity 1000 formed in the handle 100, and is held in alignment with the cavity 100 by a number of bearings 1100 engaged between the socket 112 and the handle 1000. The socket 112 is generally cylindrical in shape defining a central passage 129 therethrough and includes an inner section 124, a radial flange 126 at one end of the inner section 124, and an outer section 128 extending outwardly from the flange 126 opposite the inner section 124. On the interior surface of the socket 112 are disposed a number of axial grooves 130 that extend the length of the socket 112 through the passage 129 defined by the inner section 124 and the outer section 128. The grooves 130 can be present in any number and can have any suitable cross-sectional shape, and each includes an outwardly sloping or tapered end 132 disposed at the outer edge of the outer section 128. The grooves 130 are oriented around the interior of the socket 112 in a configuration that enables the grooves 130 to engage all of the corners of various geometric shapes present on a shaft 108, such as triangles, squares, or other polygonal shapes. In the illustrated embodiment, there are eight (8) grooves 130 located on the interior of the socket 112 in order to provide multiple four-point engagement configurations for the socket 112 and the shaft 108. Additionally, the outwardly tapered end 132 of each groove 130 provides a self-aligning function to the grooves 130 to assist in achieving the proper alignment of the shaft 108 with the grooves 130, and functions as a stop with respect to the insertion of the shaft 1087 into the socket 112 as the ends 132 engage the shaft 108 when fully inserted into the socket 112, as best shown in FIG. 10. Further, the tapered ends 132 of each groove 130 prevent the shaft 108 from binding within the socket 112 when the shaft 108 is subjected to external compressive forces acting axially on the shaft 108, such as pounding the handle 100 to drive an element engages with the shaft 108 opposite the handle 100 to a desired depth. The tapered ends 132 in the illustrated embodiment in FIG. 10 are formed complementary to the faceted surfaces 133 on the shaft 108 to promote surface to surface contact when the shaft 108 is fully seated in the socket 112 to minimize bearing stresses.

The outer section 128 also includes a number of openings 134 extending through the outer section 128 and within each of which is disposed a ball bearing 116, though the bearings 116 can have alternative shapes as well, such as pins, cylindrical rollers or wedges, among others. The openings 134 have a narrowed inner end 136 that prevents the bearings 116 from passing entirely into the interior of the outer section 128. While any number of bearings 116 and openings 134 can be used, in the illustrated embodiment best shown in FIG. 11, eight (8) of each are present to provide a secure engagement of the shaft 108 with the bearings 116 and the outer section 128 for any configuration of the shaft 108 as a result of the multiple points of engagement between the bearings 116 and the shaft 108. Additionally, in the illustrated embodiment, the bearings 116 and openings 134 are disposed in the outer section 128 at locations between the grooves 130 so as to minimize the interference of the bearings 116 with the implement engaged within the grooves 130.

The bearings 116 are retained within the openings 134 from the exterior of the socket 112 by a bushing 114 disposed around the outer section 128 of the socket 112, as best shown in FIGS. 5, 10, 12, 15-16 and 21-23. The bushing 114 is formed as a cylindrical sleeve having a diameter slightly larger than that of the outer section 128 of the socket 112, enabling the bushing 114 to slide with respect to the socket 112. The bushing 114 includes an angled axial flange 138 at one end that is disposed over the openings 134 and a radial flange 140 located opposite the axial flange 138 that abuts the end of the outer section 128 and defines an opening 142 therethrough in alignment with the central passage 129 of the socket 112. The radial flange 140 locates the axial flange 138 over the openings 134 by its contact with the outer section 128 of the socket 112, such that the axial flange 138 partially obscures the openings 134 on the exterior surface of the outer section 128 to retain the bearings 116 therein. Further, due to the close conformity of the bushing 114 to the diameter of the socket 112, when the radial flange 140 is positioned in abutting engagement with the end of the outer portion 128 of the socket 112, the axial flange 138 operates to urge the bearings 116 into the openings 134, such that a portion of each bearing 116 is positioned within the interior of the socket 112, for a purpose to be described. Alternatively, the bushing 114 can be used in connection with or replaced by other suitable activation members such as a push rod (not shown) that urges the bearings 116 into the openings 134.

The bushing 114 is held in position around the socket 112 by a locking sleeve 118 that abuts, and in the illustrated embodiment is connected to, the flange 126 on the socket 112, as best shown in FIGS. 3, 5, 12-16 and 24-26. The locking sleeve 118 is generally cylindrical in shape and defines a central passage 144 that is aligned with the opening 142 in the bushing 114 and the central passage 129 of the socket 112. The passage 144 has an inwardly tapering outer end 146 located opposite the bushing 114. Additionally, while the locking sleeve 118 can be formed with any desired configuration, in one embodiment, the sleeve 118 can include a number of teeth 148 on an exterior surface 149, such that the sleeve 118 can also function as the central gear in the ratcheting mechanism 110 disclosed in the '696 application. The sleeve 118 is affixed to the flange 126 on the socket 112 in any suitable manner, such as by welding, for example, to hold the socket 112, bushing 114 and sleeve 118 in axial alignment with one another.

As illustrated in FIGS. 3 and 5, inserted within the central passage 144 of the locking sleeve 118 is a release collar 122. The collar 122, as best shown in FIGS. 6-10 and 27-29, includes a cylindrical guide portion 150 and an outwardly extending engagement portion 152. The guide portion 150 defines a central passage 151 in alignment with the passage 144 in the sleeve 118, the opening 142 in the bushing 114 and the central passage 129 of the socket 112, and has a diameter slightly less than that of the passage 144, enabling the guide portion 150 to be inserted into the passage 144. To retain the guide portion 150 within the passage 144, the guide portion 150 includes a peripheral notch 154 in which is disposed a retaining ring 156. The ring 156 extends outwardly from the guide portion 150 into a corresponding recess 158 in the handle 100, such as in an end cap 160 secured to the handle 100 over the locking sleeve 118 to retain the sleeve 118 and socket 112 within the cavity 1000 in the handle 100. The recess 158 has a width greater than that of the ring 156 to enable the ring 156 to move within the recess 158. The ring 156 is biased into engagement with the outer end of the recess 158 by the biasing member 120, which is located in the locking sleeve 118 and engaged between the bushing 114 and the guide portion 150 of the release collar 122.

Between the biasing member 120 and the ring 156, the guide portion 150 includes a number of apertures 162 within which are disposed ball bearings 164, though the bearings 164 can have alternative shapes as well, such as pins, cylindrical rollers or wedges, among others. The apertures 162 are formed similarly to the openings 134 in the socket 112 to receive and retain the bearings 164 therein. The size of the bearings 164 is such that when the apertures 162 and the bearings 164 are aligned with the larger diameter section of the passage 144, the bearings 164 extend outwardly from the guide portion 150 into contact with the surface of the passage 144. As the biasing member 120 urges the collar 122 and guide portion 150 outwardly from the passage 144, the bearings 164 contact the inwardly tapering section of the passage 144 and are urged inwardly through the apertures 162. In this position, the bearings 164 can engage the portion of the shaft 108 positioned within the passage 151. As best shown in FIG. 10, the bearings 164 can engage the exterior surface of the shaft 108 directly, or can engage a peripheral groove 109 formed in the shaft 108.

When a shaft 108 of a suitable implement is to be engaged with the handle 100 utilizing the mechanism 106, as best illustrated in FIGS. 1-11 and 30-32, the shaft 108 includes an engagement end 166 having a suitable cross-sectional shape with a number of corners 170. The corners 170 are designed to be received within aligned grooves 130 in the socket 112 to engage the shaft 108 with the handle 100. The insertion of the shaft 108 into the grooves 130 is facilitated by the tapered ends 132 of the grooves 130. When positioned within the grooves 130, the end 166 of the shaft 108 is maintained in alignment with the handle 100 by the engagement of the grooves 130 and bearings 116 around the periphery of the engagement end 166.

To lock the shaft 108 within the handle 100 during use, initially the release collar 122 is urged inwardly into the passage 144 against the bias of the biasing member 120. In doing so, the ring 156 moves within the recess 158 until reaching the inner end of the recess 158, thereby halting further movement of the collar 122. In this position, when the engagement end 166 of the shaft 108 is inserted into the passage 151 in the collar 122, the engagement end 166 can contact the bearings 164 and urge the bearings 164 out of the guide portion 150 of the collar 122, such that the engagement end 166 can pass through the collar 122 and into the locking sleeve 118, bushing 114 and socket 112, as shown in FIG. 10. By rotating the shaft 108 as necessary, the engagement end 166 can contact the tapered ends 132 to be aligned with, seated within and engaged by the grooves 130 and bearings 116 of the socket 112, as described previously.

After the engagement end 166 is properly seated within the grooves 130 in the socket 112, the release collar 122 is released, such that the biasing member 120 urges the collar 122 outwardly from the locking sleeve 118. In doing so, the apertures 162 and bearings 164 on the guide portion 150 of the collar 122 are moved into the inwardly tapering section of the locking collar 118, where the bearings 164 are urged inwardly into the guide portion 150 of the collar 122 by the locking collar 118. However, since the shaft 108 is now positioned within the collar 122, the bearing 164 frictionally engages the shaft 108, thereby providing a secure engagement of the shaft 108 within the mechanism 106 preventing the removal of the shaft 108 from within the collar 122, so that the shaft 108 can be utilized in conjunction with the handle 100 as desired.

In addition, as the engagement end 166 of the shaft 108 is seated in the groves 130, the bearings 116, while urged partially out of the passage 129 in the socket 112, contact the engagement end 166 as a result of the position of the bushing 114 over the openings 134 in which the bearings 116 are disposed. In this position, the shaft 108 is engaged with each of the bearings 164 in the collar 122 and the grooves 130 and bearings 116 in the socket 112, resulting in two separate and spaced apart axial alignment contacts between the shaft 108 and the handle 100. With this structure for the mechanism 106, the force exerted through the handle 100 onto the shaft 108 does not alter the alignment of the shaft 108 with respect to the handle 100, i.e., greatly reduces the amount of axial misalignment or "slop", even after repeated uses, due to the engagement of the shaft 108 by both the grooves 130 and the bearings 116, as well as the bearings 164 while greatly increasing the concentricity of the shaft 108 with respect to the mechanism 106 and handle 100.

To remove the shaft 108, the collar 122 is again pressed into the locking collar 118 against the bias of the biasing member 120, which allows the bearings 164 to be disengaged from the shaft 108, and the shaft 108 can be removed from the collar 122, locking sleeve 118 and socket 112.

Thus, the mechanism 106 securely engages the shaft 108 via the bearings 164, while simultaneously maintaining the alignment of the shaft 108 with the mechanism 106 and handle 100 via the bearings 164 as well as the bearings 116 and grooves 130.

Various other embodiments of the present invention are contemplated as being within the scope of the following claims particularly pointing out and distinctly claiming the subject matter regarded as the invention.

The invention claimed is:

1. A securing mechanism for attaching the shaft of an implement to a tool, the mechanism comprising:
   a) a socket adapted to be secured to the tool, the socket including at least two grooves disposed on an interior surface of the socket and engageable with the shaft to maintain the alignment of the shaft with the mechanism;
   b) a locking sleeve including a central passage aligned with the socket and having a locking surface therein;
   c) a release collar aligned and inserted within the passage of the locking sleeve, the collar including a locking member selectively engageable the locking surface and adapted to engage the shaft;
   d) at least one bearing disposed within at least one opening in the socket positioned between the at least two grooves;

e) a biasing member disposed within the passage between the socket and the collar to bias the locking member into engagement with the locking surface; and f) a bushing disposed within the passage of the locking sleeve and engaged between the biasing member and the socket, wherein the bushing includes an axial flange which can be positioned at least partially over the at least one opening in the socket.

2. The mechanism of claim 1 wherein the at least two grooves each includes a tapered end surface.

3. The mechanism of claim 1 wherein the at least two grooves each includes an end surface adapted to conform to a complementary surface on a shaft seated within the socket.

4. The mechanism of claim 1 wherein the axial flange is angled and is adapted to engage the at least one bearing in the at least one opening.

5. A tool comprising: a) a handle; b) a securing mechanism disposed in the handle, the securing mechanism including: i) a socket adapted to be secured to the tool, the socket including at least one groove disposed on an interior surface of the socket and engageable with the shaft to maintain the alignment of the shaft with the mechanism; ii) a locking sleeve including a central passage aligned with the socket and having a locking surface therein; iii) a release collar aligned and inserted within the passage of the locking sleeve, the collar including a locking member selectively engageable with the locking surface and adapted to engage the shaft; and iv) a biasing member disposed within the passage between the socket and the collar to bias the locking member into engagement with the locking surface; c) a notch in the collar; and b) a retaining ring disposed in the notch engageable with the handle to limit the movement of the collar with respect to the handle.

6. A method for attaching a shaft of an implement to a tool using the mechanism of claim 5.

\* \* \* \* \*